(12) United States Patent
Fuchs

(10) Patent No.: US 10,384,662 B2
(45) Date of Patent: Aug. 20, 2019

(54) METHOD FOR REDUCING THE AIR HUMIDITY IN A HOUSING

(71) Applicant: SIEMENS AKTIENGESELLSCHAFT, München (DE)

(72) Inventor: Andreas Fuchs, Erlangen (DE)

(73) Assignee: SIEMENS MOBILITY GMBH, München (DE)

( * ) Notice: Subject to any disclaimer, the term of this patent is extended or adjusted under 35 U.S.C. 154(b) by 243 days.

(21) Appl. No.: 15/508,318

(22) PCT Filed: Aug. 27, 2015

(86) PCT No.: PCT/EP2015/069657
§ 371 (c)(1),
(2) Date: Mar. 2, 2017

(87) PCT Pub. No.: WO2016/034493
PCT Pub. Date: Mar. 10, 2016

(65) Prior Publication Data
US 2017/0282883 A1  Oct. 5, 2017

(30) Foreign Application Priority Data

Sep. 3, 2014  (EP) .................................. 14183340

(51) Int. Cl.
| F26B 3/00 | (2006.01) |
| B60T 17/00 | (2006.01) |
| B60T 13/26 | (2006.01) |
| B60T 17/04 | (2006.01) |
| B01D 53/26 | (2006.01) |

(52) U.S. Cl.
CPC ............ *B60T 17/004* (2013.01); *B60T 13/26* (2013.01); *B60T 17/04* (2013.01); *B01D 53/26* (2013.01)

(58) Field of Classification Search
CPC ............ F26B 5/04; B60T 13/26; B01D 53/26
USPC ............ 34/472, 402, 403, 406, 443, 474, 72
See application file for complete search history.

(56) References Cited

U.S. PATENT DOCUMENTS

| 6,250,095 B1 | 6/2001 | Kametani et al. | |
| 2007/0103002 A1* | 5/2007 | Chiao | B60K 6/46 307/10.1 |
| 2009/0001001 A1 | 1/2009 | Martin | |
| 2009/0045761 A1 | 2/2009 | Fuchs et al. | |
| 2009/0072772 A1 | 3/2009 | Fuchs et al. | |
| 2015/0165930 A1* | 6/2015 | Sawa | B60L 7/26 701/19 |

FOREIGN PATENT DOCUMENTS

| CN | 102656737 A | 9/2012 |
| DE | 42 05 735 A1 | 8/1992 |
| DE | 198 38 950 A1 | 3/2000 |
| DE | 101 35 849 A1 | 2/2003 |
| DE | 102 53 357 A1 | 6/2004 |

(Continued)

*Primary Examiner* — John P McCormack
(74) *Attorney, Agent, or Firm* — Henry M. Feiereisen LLC

(57) ABSTRACT

Compressed air supplied into a housing is expanded for reducing air humidity in the housing in response to the expansion of the compressed air. As a result, it is possible in a simple manner for a component to be operated in a dry environment. The component can be dried and condensation on the component can be prevented.

10 Claims, 2 Drawing Sheets

(56) References Cited

FOREIGN PATENT DOCUMENTS

| DE | 103 33 917 B3 | 1/2005 | |
|---|---|---|---|
| DE | 10 2006 023 785 A1 | 12/2006 | |
| DE | 10 2012 015 041 A1 | 5/2014 | |
| DE | 102012015041 A1 * | 5/2014 | ............ F21S 45/33 |
| EP | 0 859 188 A2 | 8/1998 | |
| RU | 2008139194 A | 4/2010 | |
| SU | 814421 A1 | 3/1981 | |
| WO | WO 2007098936 A1 | 9/2007 | |

\* cited by examiner

METHOD FOR REDUCING THE AIR HUMIDITY IN A HOUSING

CROSS-REFERENCES TO RELATED APPLICATIONS

This application is the U.S. National Stage of International Application No. PCT/EP2015/069657, filed Aug. 27, 2015, which designated the United States and has been published as International Publication No. WO 2016/034493 A1 which claims the priority of European Patent Application, Ser. No. 14183340.0, filed Sep. 3, 2014, pursuant to 35 U.S.C. 119(a)-(d).

BACKGROUND OF THE INVENTION

The invention relates to a method for reducing the air humidity in a housing. The invention further relates to a drying device and a vehicle, in particular a rail vehicle comprising such a drying device.

Electrical, electronic or mechanical components and parts are sensitive relative to humidity in the ambient air. These components are used in many different types of devices. Thus, for example, printed circuit boards of electronic devices are constructed from electrical or electronic components. Prolonged humidity puts these components at risk so that these components malfunction more frequently than components operated in dry conditions. This affects all or at least almost all electronic components and devices which are constructed from electrical, electronic or mechanical components.

A particular problem arises in applications which are operated in non air-conditioned or non temperature-adjusted environments. The air humidity potentially present in this environment may lead to condensation and thus to humidity on the components. Similarly, a fluctuation of temperatures leads to condensation of the humidity from the air on the components. This condensation reduces the service life of the components so that these components malfunction more frequently than components operated in dry conditions. Moreover, due to the humidity, corrosion may prevent a safe and reliable operation of these components and the systems constructed therefrom.

In particular in tropical countries it has proved advantageous in this case to install such arrangements, as described above, in relatively airtight cabinets and/or to introduce desiccants into these cabinets. The desiccant then has to be replaced periodically. Depending on the ambient humidity, this may result in very short replacement times of a few days. This has a negative impact on the availability of such systems due to the short maintenance intervals which are present. At the same time, the maintenance costs for the operation of these systems consequently rise.

SUMMARY OF THE INVENTION

The object of the invention is to specify a method for reducing the air humidity in devices which may be implemented in a particularly simple manner and which also has a low maintenance cost.

According to one aspect of the invention, the object is achieved by a method for reducing the air humidity in a housing by compressed air being expanded in the housing.

According to another aspect of the invention, the object is achieved by a drying device which includes a housing, a device for producing compressed air and a component, wherein the component is arranged in the housing, wherein the device for producing compressed air is connected to the housing, such that compressed air produced by means of the device is able to be expanded in the housing by means of a device for expanding compressed air, such that the humidity of the air present in the housing is reduced.

According to still another aspect of the invention, the object is achieved by a vehicle, in particular by a rail vehicle including a drying device, as set forth above or a power converter which can be represented by the housing.

The invention is based on the recognition that the air humidity in a housing may be reduced by compressed air being expanded in the housing. "Expanded" is understood by the person skilled in the art as the reduction in the pressure of a gas with the simultaneous increase in its volume. By the expansion of compressed air the humidity of the air present in the housing is reduced. Air with a greater proportion of air humidity is displaced by the incoming expanded compressed air, so that the air humidity in the housing reduces. This dry air is then able to absorb humidity from components in order to dry the component as a result. Moreover or alternatively, the dry air in the housing prevents the condensation of humidity on the component. In particular, condensation caused by temperature fluctuations in the environment may be prevented by the method for reducing the air humidity. The term "components" also encompasses, in addition to electrical, electronic and mechanical parts, insulating materials, for example for sound insulation and temperature insulation, and sealing compounds which due to their character are able to absorb humidity from the air. The housing in this case may be designed to be sealed in order to keep the penetration of humid air as low as possible. In this case it has proved advantageous if the housing has an external interface, the compressed air in the housing being able to be regulated or controlled thereby. Thus it is possible, for example, to produce a higher pressure in the interior of the housing relative to the environment of the housing which prevents the penetration of humid air from the environment in a simple manner. Moreover, the interface for regulating the compressed air permits the introduction of high quantities of air without having a direct effect on the air pressure in the interior of the housing. Thus quantities of air of the expanded compressed air and the pressure in the housing are decoupled from one another. This method is also suitable, in particular, for housings which are not hermetically sealed. Incoming air, the humidity thereof being able to lead to, or leading to, condensation on the components, may be removed or displaced by this method. The method has the result that the air contains less humidity and also no condensation occurs on the components, even in the case of a dropping temperature. The expansion of the compressed air may take place continuously at specific times, for example periodically or in an event-controlled manner. The process of expansion may take place in a controlled manner via the device for the expansion of compressed air, such as for example valves or nozzles. For controlling the air quantity and/or the times, a control unit or regulating unit may be provided, said unit regulating and/or controlling the supply of dry air depending on environmental parameters, such as for example the moisture content of the ambient air or the air inside the housing, the temperature, etc. In the method according to the invention, the compressed air may be produced inside the housing or may even be supplied to the housing by being externally produced, for example by means of a suitable pipe system.

In a further advantageous embodiment, compressed air is supplied to the housing from outside. In this embodiment, the parts for the compressed air production are arranged outside the housing. The compressed air is supplied to the inside of the housing via a suitable pipe system or hoses. Thus it is possible to construct the housing, which comprises the component provided for operation in a dry environment, to be as small as possible and in a manner which is as space-saving as possible. Thus the method according to the invention requires no additional, or barely any additional, constructional space. Moreover, it is possible to use compressed air already present in the vicinity by said compressed air being introduced into the housing, for example by a pipe and/or hose system. The production of compressed air may take place, for example, by means of a compressor. It has proved particularly advantageous to use compressed air which is already produced for other tasks. Thus specific or additional production of compressed air is not required for the application of reducing the air humidity.

In a further advantageous embodiment, the compressed air is dried before the expansion. "Drying" is understood as the reduction in the humidity present in the compressed air. In many applications which require compressed air, drying is already carried out immediately after compression. This has the advantage that the pipe system for distributing the compressed air is dry in order to prevent completely or at least substantially corrosion produced by humidity in this pipe system and in a reliable manner. Moreover, compressors are often already provided with a corresponding drying device. By the use of these standard components a corresponding system may be constructed in a simple and cost-effective manner. The method for reducing the air humidity is markedly more effective by the use of compressed air which is already dry. Thus a reduction in the air humidity may already be carried out efficiently with small quantities of compressed air.

In a further advantageous embodiment, the housing is a component of a vehicle, wherein the compressed air which is produced for operation of the vehicle is also used for the expansion in the housing. In vehicles it has proved advantageous to use compressed air for reducing air humidity, said compressed air being required at a different point for the operation of a vehicle. In trucks, for example, the brake is often operated by means of compressed air. This compressed air may be used by a suitable pipe system or hose system on at least one component to be dried and may be used by means of a device for the expansion of compressed air for reducing the air humidity. Equally, this arrangement is also suitable for preventing condensation on the component, in addition to drying the components. Vehicles are generally subjected to large temperature differences. Therefore, it is particularly important here to avoid condensation of the air humidity. By the use of parts of a vehicle already present the costs for carrying out the method for reducing the air humidity is insignificant. Thus it is possible to dry a component and/or to prevent condensation on this component in a cost-effective manner.

In a further advantageous embodiment, the vehicle is a rail vehicle, wherein the compressed air which is produced for the operation of the rail vehicle is used for a braking system of the rail vehicle. The advantage of this method is that the compressed air is available in the entire rail vehicle. Thus the drying of one or more components may take place at any point of the rail vehicle. Similarly, the condensation of humidity on one or more components may be prevented. The compressed air in rail vehicles is generally dried by a compressed air dryer, so that residual humidity of less than 35% is produced in the compressed air. To this end, standards for air quality are set by the international ISO standard 8573 which requires a residual humidity of the compressed air of less than 35%. This small amount of humidity, also denoted as residual humidity, reduces considerably further when the compressed air is expanded for drying the components. By the presence of compressed air for the braking system of a rail vehicle and the high requirements for air quality prevailing therein with a residual humidity of less than 35%, the method is suitable for reducing the air humidity, in particular for rail vehicles, in order to dry components or prevent condensation thereon. In addition, due to the operation of a rail vehicle in different external temperatures, the risk of humidity occurring is particularly high, for example by the formation of condensed water. For this application, the method according to the invention is able to be used in a particularly economical manner since condensation of the air humidity is effectively prevented by the method. Maintenance operations which are required with the use of desiccants, may be dispensed with or at least carried out at considerably longer intervals. This significantly reduces the maintenance costs. By the increased availability of the rail vehicle, the scheduling of the use of the rail vehicle may be arranged in a considerably simpler manner. This also reduces, therefore, the logistics costs during operation of the rail vehicles. It has proved advantageous in the method according to the invention to use the main air tank line of the rail vehicle for supplying the compressed air. This is supplied by the main air tank of the rail vehicle. The air compressor, the compressor of a rail vehicle, holds the pressure in the main air tank between 8.5 and 10 bar. Thus in the rail vehicle, in particular, an air pressure of between 8.5 bar and 10 bar is provided for carrying out the method. Also the use of the main air line for providing compressed air for the method according to the invention has proved expedient. Thus a pressure of the compressed air in the range of 4 bar to 6 bar is available for the method according to the invention.

In a further advantageous embodiment, the compressed air is used in order to produce a greater air pressure in the housing than in the environment outside the housing. In addition to the problem of humidity in components, a problem of soiling also results due to the air flowing in from the environment. The soiling is produced by the penetration of dirt particles which penetrate the housing with the air from the environment. The penetration of dirt particles may be prevented in a simple manner by the pressure inside the housing being greater than in the surroundings of the housing. As a result, the penetration of dirt particles is effectively prevented.

In a further advantageous embodiment, the method is used for drying at least one component or for preventing condensation on at least one component. The component may be an electrical, electronic or mechanical component. Equally, this includes components which have a combination of electrical, electronic and mechanical parts. An example thereof might be printed circuit boards, electronic circuits, measuring and control devices and computers. A particularly high requirement for low humidity is set for these components. Humidity and thus corrosion, optionally associated therewith, may in part considerably reduce the service life of these components. Condensation on these components may be prevented by means of the method for reducing the air humidity. If humidity is already present on the component, these components may be dried. This method ensures a reliable operation and in part leads to a considerably longer service life. The maintenance cost for removing humidity or due to the premature malfunction of components, may be considerably reduced as a result.

In a further advantageous embodiment the component is a power semiconductor. Humidity in the vicinity of power semiconductors may also lead to a high rate of malfunction of these components. A malfunction of these components, in the case of a fault, may lead to further malfunctions and/or damage in the system due to the high energy by which power semiconductors are operated. In some cases, a risk to personnel in the immediate environment of the power semiconductor may also not be excluded. Thus it is specifically required to prevent malfunctions in power semiconductors. By means of the method according to the invention, malfunctions due to humidity are avoided or at least considerably reduced. Firstly, this reduces the costs for corrective maintenance and servicing and secondly the replacement part costs for faulty, and in some cases very expensive, power semiconductors are also saved since the service life of the power semiconductors increases when operated with dry air. Since the malfunction of power semiconductors may also have a negative effect on the other components in the environment, repair costs are significantly saved by the method according to the invention.

In a further advantageous embodiment, a predeterminable maintenance interval is achieved by adapting the air humidity inside the housing. The malfunction of components may be prevented or at least delayed by said components being free, or at least virtually free, of humidity. The degree of humidity on these components is determined, amongst other things, by the humidity of the ambient air. The drier the air in the environment of the components, the less humidity is present on the components. In order to achieve a particularly long service life, the air in the housing is correspondingly completely dried. This takes place by the method according to the invention by means of the expansion of compressed air. In the case of predetermined maintenance intervals as is the rule, for example, in vehicles or in particular rail vehicles, an optimum may be implemented which firstly results in a service life which is as long as possible and secondly results in low costs when carrying out the method according to the invention. A maintenance interval of the system or of the vehicle is thus no longer solely determined by high air humidity in the environment. The drier the air in the housing, the more costs are produced by corresponding compressors or other parts of the compressed air system, such as for example devices for drying the compressed air. The object of a cost-effective solution is to design the system for drying the components such that firstly the ambient air is sufficiently dried and secondly the system is able to be produced cost-effectively.

In a further advantageous embodiment, the housing is a power converter or a part of a power converter. Power converters are generally particularly important for the operation of an system or a vehicle, since they are often absolutely necessary for the operation thereof. Due to the high costs of a power converter, power converters are rarely designed to be redundant. A malfunction of the power converter consequently often causes the malfunction of the system or the entire vehicle. At least the performance is considerably restricted. In a rail vehicle, power converters are used for the traction and for the supply of auxiliary systems. The term "auxiliary systems" is understood as the devices of the vehicle which have to be supplied with electrical energy, such as for example the air-conditioning units, lighting systems, train safety systems, compressors, etc. A malfunction of these parts thus has a direct effect on the operation of the system or the vehicle. A malfunction of a power converter in the traction or the auxiliary system supply frequently causes the complete malfunction of the rail vehicle. At least, operation is still only possible to a very limited extent. Therefore, in the construction and the design of rail vehicles, while ensuring a high degree of availability, particular attention is given to the protection from malfunction of these power converters. By the operation of the power converter or parts of the power converter using air of low humidity, a significant contribution to a high degree of protection from malfunction may be achieved.

BRIEF DESCRIPTION OF THE DRAWINGS

The invention is described and explained in more detail hereinafter with reference to the exemplary embodiments shown in the drawings, in which.

DETAILED DESCRIPTION OF THE EMBODIMENTS

Figure 1:
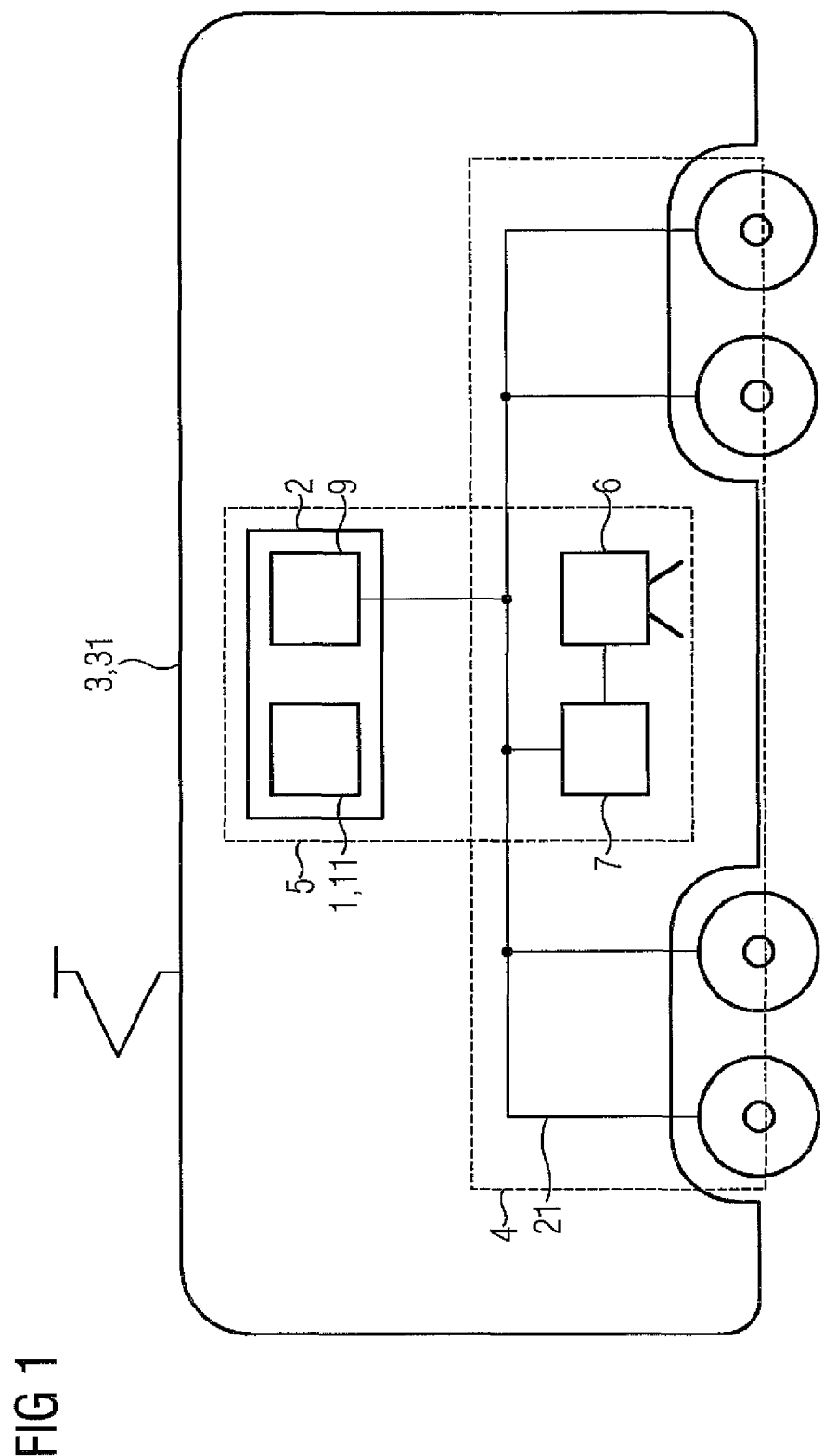
FIG. 1 shows a rail vehicle with a drying device.

FIG. 1 shows a vehicle 3 which is a rail vehicle 31. Said rail vehicle has a braking system 4 and a drying device 5 for reducing the air humidity. The drying device 5 comprises a housing 2 with one or more components 1 to be dried, in particular power semiconductors 11 and a device 9 for the expansion of compressed air. Moreover, in this exemplary embodiment the drying device 5 has a device 6 for producing compressed air 10 as well as a means 7 for drying compressed air 10. The braking system 4 comprises a device 6 for producing compressed air 10. The compressed air 10 is located in the interior of the pipe system 21. Moreover, the braking system 4 comprises means 7 for drying compressed air 10. In this exemplary embodiment of the rail vehicle, the device 6 for producing compressed air 10 and the means 7 for drying compressed air 10 are used together by the drying device 5 and the braking system 4, so that these parts do not have to be duplicated. For the purpose of braking, compressed air is distributed to the individual wheel sets. At this point a differentiation is not made here between different parts of the brake, such as for example the main air line and the main air tank line. By means of the device 6 for producing compressed air 10, air is suctioned from the environment and compressed to form compressed air 10. This is dried by means of a means 7 for drying compressed air 10. "Drying" is understood as the reduction in the humidity contained in the compressed air 10. This drying serves to create compressed air 10 in the pipe system 21 which is as low as possible in terms of humidity. As a result, corrosion on the pipe system 21 and parts connected thereto may be prevented or at least substantially reduced. At the same time, the drying of the compressed air 10 serves to maintain corresponding requirements relative to the humidity of the compressed air 10 for use in rail vehicles 11. For reasons of clarity, not all parts of the braking system 4 are shown in this exemplary embodiment. In this case, for example, compressed air tanks, valves and brake cylinders are absent. Also, for distributing the compressed air in the braking system, a precise differentiation, such as for example between the main air line and the main air tank line, has been dispensed with. The compressed air 10 is supplied to the individual brakes of the individual axles/wheels to be braked by the pipe system 21. By suitable control and regulating devices, the braking of the rail vehicle 11 may take place by means of compressed air 10. The arrangement 5 for reducing the air humidity in this case uses the compressed air 10 produced by the braking system 4, since the device 9 for the expansion of compressed air 10 is also supplied from the pipe system 21 for compressed air 10. To this end, compressed air is supplied to the housing 2 via the pipe system 21. Alternatively or additionally, the device 9 for the expansion of compressed air 10 may also directly draw in compressed air via a separate line from the device 6 for producing compressed air 10 or the means 7 for drying compressed air 10. A device 9 for the expansion of compressed air 10 is arranged in the housing 2. The already dried compressed air is expanded by means of this device 9 for reducing the air humidity. As a result, the humidity of the air in the housing 2 reduces further and the air is able to absorb humidity present on the component 1 and/or prevent the condensation of humidity on the component 1 in a simple manner. Humidity present on the component 1, in particular on one or more power semiconductors 11, may as a result be eliminated in a particularly simple manner or at least may be substantially reduced. As shown in this exemplary embodiment, the device 9 for the expansion of compressed air 10 in the housing 2 uses parts which are already present for producing and drying compressed air 10 of the braking system 4. As a result, for carrying out the reduction in the air humidity, the drying device 5 is able to be produced in a particularly cost-effective manner. This cost advantage also has a positive effect on the production costs of the rail vehicle 31.

Figure 2:
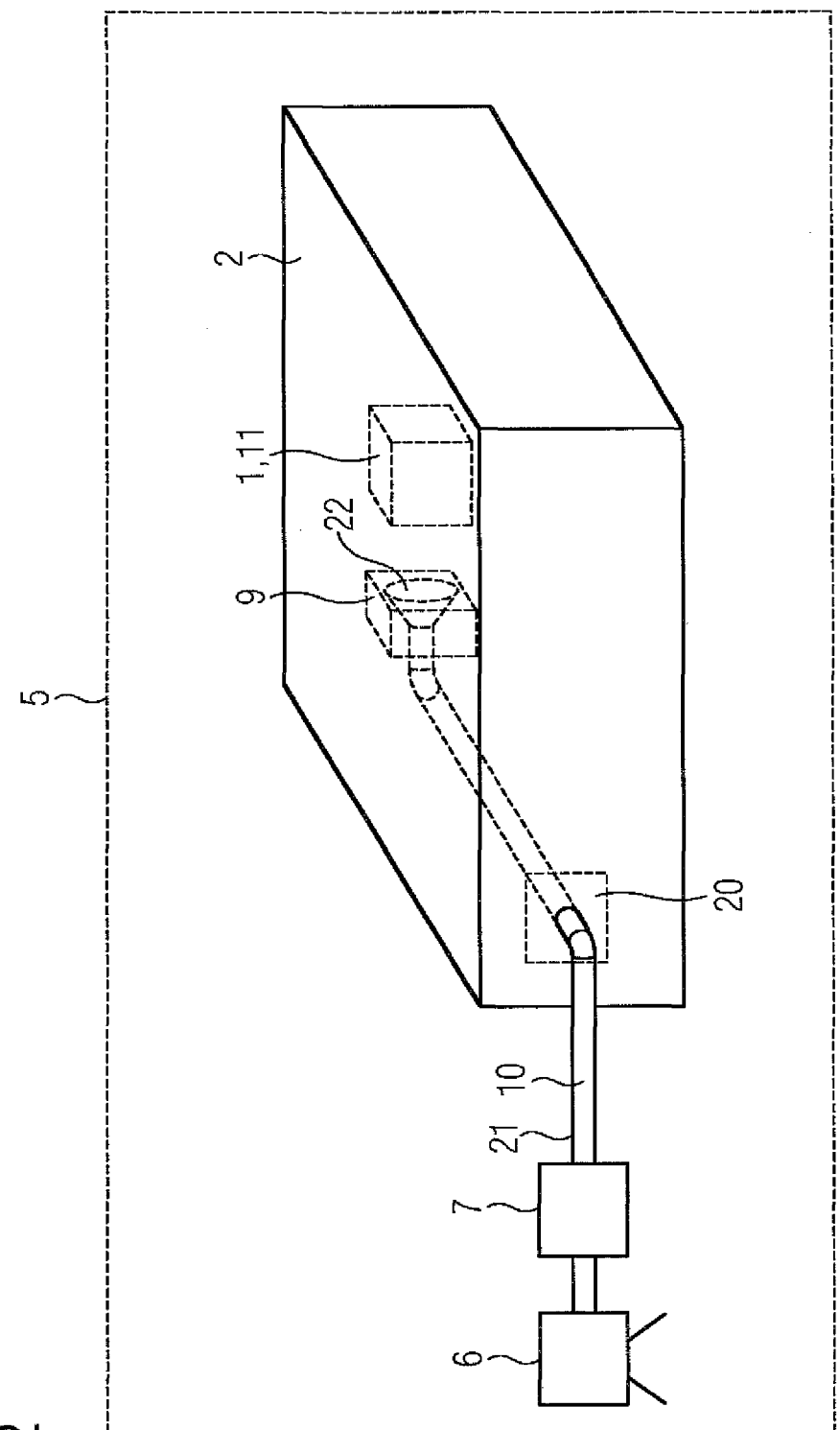
FIG. 2 shows a drying device.

FIG. 2 shows a drying device 5 for reducing the air humidity. In order to avoid repetition, reference is made to FIG. 1 and the reference numerals inserted therein. The housing 2, the device 6 for producing compressed air 10 and the means 7 for drying compressed air 10 are shown. In this exemplary embodiment, the device 6 for producing compressed air 10 and the means 7 for drying compressed air 10 are arranged outside the housing 2. It is also possible to arrange at least one of these parts in the interior of the housing 2. In the embodiment shown, after drying by the means 7 for drying the compressed air 10 the compressed air 10 is guided through an interface 20 for supplying compressed air 10 into the inside of the housing 2. In the inside of the housing 2 the compressed air 10 is further conducted via a corresponding pipe system to the device 9 for the expansion of compressed air 10. The device has suitable means in order to expand the compressed air 10. In this case, the expansion may be carried out in a continuous, controlled or regulated manner. To this end, one or more parts, such as for example a nozzle or a valve 22, may be present in the device 9. For example, depending on the air humidity present in the interior of the housing 2 the expansion of the compressed air 10 may be controlled or regulated thereby in order to achieve the desired humidity of the air in the housing 2. The desired air humidity may in this case be predetermined for the system.

Although the invention has been further illustrated and described in detail by the preferred exemplary embodiments, the invention is not limited solely to the disclosed example and other variants may be derived therefrom by the person skilled in the art, without departing from the protected scope of the invention.

What is claimed is:

1. A method, comprising producing, in a drying device of a rail vehicle, compressed air for operation of the rail vehicle, expanding the compressed air in a housing of the drying device for reducing air humidity in the housing, wherein at least one component is arranged in the housing.

2. The method of claim 1, wherein the compressed air is dried before the expansion.

3. The method of claim 1, further comprising supplying the compressed air to the housing from outside.

4. The method of claim 1, wherein the compressed air generates in the housing an air pressure which is greater than an air pressure outside the housing.

5. The method of claim 1, wherein the compressed air with reduced air humidity is capable of preventing condensation, caused by temperature fluctuations in an environment, on at least one component inside the housing by absorbing humidity.

6. The method of claim 1, wherein the at least one component is a power semiconductor.

7. The method of claim 1, further comprising establishing a predeterminable maintenance interval by adapting the air humidity inside the housing.

8. A rail vehicle, comprising: a braking system; and, a drying device including a housing, a component arranged in the housing, a first device for producing compressed air, said first device being connected to the housing, and a second device for expanding the compressed air, said second device interacting with the first device such that compressed air produced by the first device is expanded in the housing, wherein the drying device includes a pipe system connected to the braking system of the rail vehicle, said pipe system supplying the compressed air produced by the first device to the braking system.

9. The vehicle of claim 8, wherein the housing is a power converter or a part of a power converter.

10. The vehicle of claim 8, wherein the compressed air is supplied to the housing from outside.

* * * * *